United States Patent [19]

Vanbennekom et al.

[11] 3,717,118
[45] Feb. 20, 1973

[54] INDICATING INSTRUMENT WITH INTERCHANGEABLE FACE ASSEMBLY

[75] Inventors: Carl Frederick Vanbennekom; William James Schultz, both of Lynnfield, Mass.

[73] Assignee: General Electric Company, Lynn, Mass.

[22] Filed: Nov. 27, 1970

[21] Appl. No.: 93,184

[52] U.S. Cl. ................. 116/129, 73/431, 324/156
[51] Int. Cl. ................................................. G09f 9/00
[58] Field of Search ..... 116/129, 114; 73/431; 58/54, 58/56; 324/156, 158; 220/82

[56] References Cited

UNITED STATES PATENTS 1,928,287   9/1933   Granger ............................. 58/56
2,874,531   2/1959   Cattell ............................. 58/56 X

*Primary Examiner*—Louis J. Capozi
*Attorney*—William S. Wolfe, Gerald R. Woods, Frank L. Neuhauser, Oscar B. Waddell and Joseph B. Forman

[57] ABSTRACT

An electrical indicating instrument including a mechanism, a housing for the mechanism, and a face assembly through which an indicator driven by the mechanism is viewed. The face assembly is removably secured to the housing to permit the mechanism-cover assembly to be used interchangeably with face assemblies of different styles.

4 Claims, 1 Drawing Figure

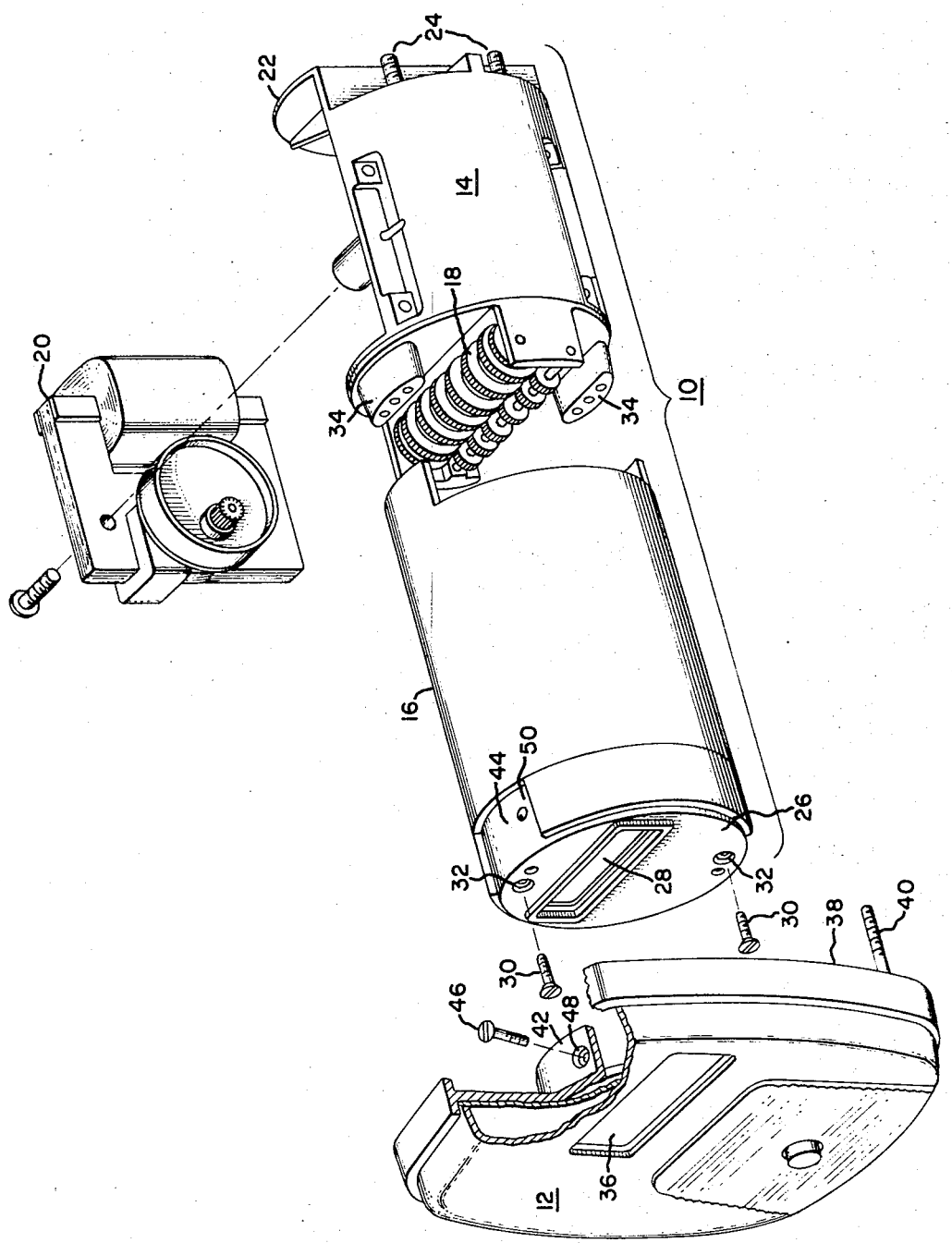
INVENTORS:
CARL F. VanBENNEKOM,
WILLIAM J. SCHULTZ,
BY
THEIR ATTORNEY.

INDICATING INSTRUMENT WITH INTERCHANGEABLE FACE ASSEMBLY

BACKGROUND OF THE INVENTION

The present invention relates to indicating instruments, and, more particularly, to an indicating instrument having an interchangeable face assembly.

Although the primary function of indicating instruments of the type in widespread use is to provide a visual indication of the value of a measured value, the appearance of the instrument is often important to users. A particular style of instrument face is often selected by a user on the grounds that style will be in harmony with the environment in which the instrument, or more typically a cluster of similarly appearing instruments, will be found. For example, a steel mill owner might prefer an instrument face with a rugged look whereas an oil refinery owner might want an updated or sophisticated look.

Indicating instrument manufacturers, recognizing the commercial significance of owner preference as to instrument face styling, commonly produce several lines of indicating instruments using the same instrument mechanism but having different instrument faces. According to conventional manufacturing techniques, an instrument face is molded or machined as an integral part of the frame in which the instrument mechanism is mounted. Since each instrument in each product line is conventionally manufactured independently, a manufacturer faces a dilemma of sorts. If the manufacturer feels that rapid delivery to customers is essential, he is compelled to maintain a large inventory of finished instruments in each of the several product lines. If the manufacturer feels that he cannot afford to maintain a large inventory, he is compelled to rely on manufacturing facilities to fill incoming orders, even though this increases the order-to-delivery cycle time. The increased cycle time puts the manufacturer at a competitive disadvantage since any prospective purchaser normally considers delivery time to be a significant factor in his choice of an instrument supplier.

In addition, the fact that each instrument is constructed as a separate entity using conventional manufacturing techniques makes it difficult to provide customized styling for customers. Where a customer, such as an original equipment manufacturer, wields great buying power, the instrument manufacturer normally makes customized instruments even though he must do so at a greatly increased cost per instrument due to the costs of manufacturing changes needed to produce the desired style.

SUMMARY OF THE INVENTION

To overcome these and other disadvantages of the prior art, the present invention contemplates an indicating instrument which comprises an instrument body having an indicator assembly and a housing for the assembly. A separable instrument face includes rearwardly extending means which are adapted to overlap a portion of the housing. The instrument face is removably secured to the housing at the overlap. Since the instrument face and the instrument body are separable sub-assemblies according to the present invention, instrument faces having any desired styling may be used interchangeably with the same instrument body.

DESCRIPTION OF THE DRAWING

While the specification concludes with claims particularly pointing out and distinctly claiming that which is regarded as the present invention, details of a preferred embodiment of the invention may be more readily ascertained from the following detailed description when read in conjunction with the accompanying drawing of an indicating instrument constructed in accordance with the present invention.

DETAILED DESCRIPTION

The indicating instrument shown in the drawing is a time meter having a body assembly 10 consisting of a mechanism assembly 14 and a tubular housing 16 which in the preferred embodiment are unitary molded plastic members. The meter includes an indicator assembly 18 consisting of a number of parallel wheels having numerals on the edge thereof. These wheels indicate elapsed time in the same way a car odometer indicates elapsed mileage. The indicator assembly 18 is driven through a gearing arrangement (not shown) by a synchronous electric motor 20 bolted to a frame 22 used to support the components of the mechanism assembly 14. Power is provided to the electric motor 20 through a pair of terminals 24 protruding from the rear surface of the frame 22.

The mechanism assembly 14 is encased within a tubular housing 16 that includes a front circular surface 26 having an opening 28 therein aligned with the indicator assembly 18. The housing 16 is slipped over the mechanism assembly 14 and is secured to the frame 22 by means of screws 30 which are threaded through openings 32 in the surface 26 into bosses 34 on the frame 22.

Where the indicating instrument is to be used in a hostile environment, it may be desirable to protect the mechanism assembly 14 by hermetically sealing it within the housing 16. Hermetic sealing is accomplished by inserting a transparent window material into the opening 28 in surface 26 and by sealing the sidewall of housing 16 to the frame 22 at the rear edge of frame 22. Where the frame 22 and the housing 16 are made of plastic materials, the sealing may be affected by applying a suitable solvent at the joint between housing 16 and frame 22.

An instrument face assembly 12 includes an opening 36 through which the indicator assembly 18 may be viewed. The instrument face assembly 12 may be secured to the housing 16 by means of a rearwardly extending flange member 42 which overlaps a molded depressed sector 44 in the housing sidewall when the instrument face is in place. As may be seen from the drawing, a preferred embodiment of the invention uses an arcuate member 42 which conforms in size and shape to the missing sector 44 in the circular sidewall of the housing 16 adjacent the surface 26. One or more threaded fasteners, such as a screw 46, may be threaded through opening 48 in the member 42 into an aligned boss 50 in the sidewall of housing 16.

Normally, the face assembly 12 will include a mounting flange 38 with a plurality of studs 40, only one of which is shown, protruding from the rear surface of the flange. The entire instrument is mounted in a panel by inserting the instrument body through a large central opening in a panel and the studs 40 through smaller openings around the central opening. Conventional nuts are threaded on to the studs 40 to draw the mounting flange into contact with the panel surface.

The styling of the visible surface of the instrument face assembly 12 can be changed in any way the maker desires. As long as a particular face assembly includes a rearwardly extending member of the same size and configuration as the member 42 shown in the drawing, the particular instrument face may be used interchangeably with the face assembly 12. Therefore, it is possible for a manufacturer to stock a limited inventory of instrument body assemblies and a separate limited inventory of instrument face assemblies of different styles and to perform final assembly of the two only after an order is received. Since joining the instrument face assembly to the body assembly is a simple operation, order-to-delivery cycle time is greatly reduced. Also, the fact that the face assembly may be changed without necessitating changes in the body construction makes it a relatively easy and inexpensive matter to customize indicating instruments to a customer's specifications.

While there has been described what is believed to be a preferred embodiment of the invention, it will be appreciated that those skilled in the art will conceive of variations and modifications once they become familiar with the invention. For example, although the illustrated embodiment is of a time meter having a mechanical display, it will be appreciated that the invention is equally applicable to any indicating instrument with a digital display or any other display which may be viewed through aligned openings in the instrument face assembly and the housing. Therefore, it is intended that the appended claims shall be construed as including all such variations and modifications as fall within the true spirit and scope of the invention.

We claim:

1. An indicating instrument comprising:
   a. an indicator assembly having display means for visually indicating the condition of a selected variable and drive means for controlling said display means in response to inputs of the variable;
   b. a housing for said indicating assembly including a sidewall and a front surface having an opening therein through which said display means may be viewed;
   c. an instrument face having an opening aligned with the opening in the front surface of the housing and rearwardly extending flange means; and
   d. means for removably securing said instrument face to said housing with the rearwardly extending flange means overlying a depression in the sidewall of said housing adjacent the front surface.

2. An indicating instrument as recited in claim 1 wherein the instrument face further includes means for mounting the face to a panel.

3. An indicating instrument as recited in claim 1 wherein the depression in the sidewall of said housing adjacent the front surface defines a partially complete circle whereas the rearwardly extending flange means on said face defines an arcuate sector conforming in size and shape to the depression.

4. An indicating instrument as recited in claim 3 wherein said securing means comprises one or more threaded fasteners extending radially inward through the arcuate sector on said face into the material of said housing.

* * * * *